United States Patent [19]

Yagi et al.

[11] Patent Number: 4,931,359

[45] Date of Patent: Jun. 5, 1990

[54] ELECTROSTATIC RECORDING MEDIUM

[75] Inventors: Hisanori Yagi, Ibaraki; Kousuke Hamada, Amagasaki; Isamu Nakano, Takatsuki; Yoshihiro Nishimura, Amagasaki, all of Japan

[73] Assignee: Kanzaki Paper Manufacturing Company, Ltd., Tokyo, Japan

[21] Appl. No.: 219,385

[22] Filed: Jul. 15, 1988

[30] Foreign Application Priority Data

Jul. 24, 1987 [JP] Japan ................................ 62-186097
Dec. 2, 1987 [JP] Japan ................................ 62-306266

[51] Int. Cl.$^5$ ........................ B32B 5/16; G03G 13/04

[52] U.S. Cl. .................................... 428/325; 428/331; 428/336; 428/511; 428/512; 428/513; 427/121; 430/48

[58] Field of Search ............... 428/325, 331, 334, 336, 428/511, 512, 513; 430/48; 427/121

[56] References Cited

U.S. PATENT DOCUMENTS 3,956,562 5/1976 Shibata et al. ........................ 428/323
3,991,253 11/1976 Markhart et al. .................... 428/325

*Primary Examiner*—George F. Lesmes
*Assistant Examiner*—Christopher Brown
*Attorney, Agent, or Firm*—Larson & Taylor

[57] ABSTRACT

Disclosed is an electrostatic recording medium comprising an electroconductive support and a dielectric layer formed on the electroconductive support and containing an insulating resin and a pigment, characterized in that the pigment comprises kaolin having a quartz content of not more than 2% by weight and that the dielectric layer has, on the surface thereof, projections based on the pigment and having an equivalent diameter of 5-15 um as spacers.

18 Claims, 1 Drawing Sheet

ELECTROSTATIC RECORDING MEDIUM

Figure 1:
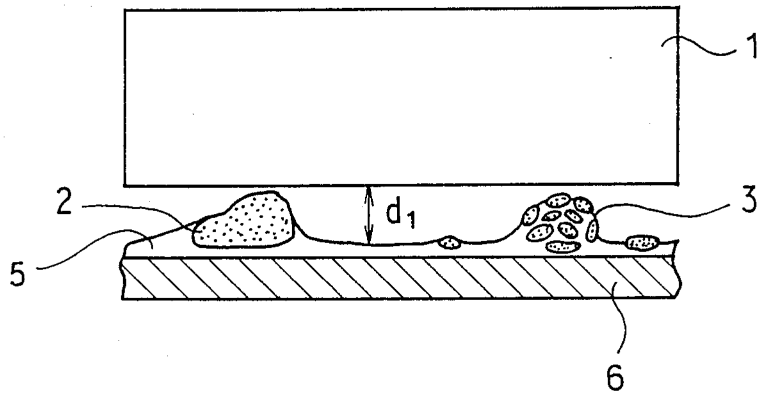

The present invention relates to an electrostatic recording medium suitable for high density (e.g. 400 dots-/inch) electrostatic facsimile devices, electrostatic printers, electrostatic plotters and so on.

As a result of the recent progress of communications technology, electrostatic recording systems are now in wide use as means for achieving both of high speed recording and high image quality. Thus, for example, electrostatic facsimile devices and printers are used as output devices of optical communications and computer systems. Particularly in CAD or computer-aided design technology, high-density electrostatic printers or plotters are preferably used as output devices.

The multi-stylus recording method which has been most prevalently utilized in the field of electrostatic recording may be classified into two types, namely the dual array writing head type and the type wherein the control electrode is disposed on the same face as the stylus. When the recording density is of the order of 200 dots/inch, which is sufficient for recording documents, the discharge condition is not a serious problem with either type, due probably to the adequate sectional area of each recording stylus. However, when the recording density is as high as about 400 dots/inch, which is desired for recording figures or drawings, the conventional recording media fail to give records of satisfactory quality. Thus, in the recording of a fine line, there arises not only the problem of so-called dropout (i.e. the phenomenon that an unstable discharge results in local discontinuities of the fine line image) but also the problem of so-called flare which is an abnormal spreading of the area exposed to an abnormal discharge which may occur from place to place and may amount to an area more than 10 times as broad as the sectional area of each stylus electrode.

In electrostatic recording by the multi-stylus technique, it is important to control the smoothness of the dielectric layer of the electrostatic recording medium. Thus, attempts have so far been made to overcome the above problems by adjusting the particle size of the pigment in the dielectric layer to thereby control the surface smoothness of said layer and thus attain an adequate multi-stylus electrode to recording medium distance. However, the results are not fully satisfactory.

Attempts have also been made to attain good image recording by imparting an electrostatic charge which is opposite in polarity to the electrostatic charge for recording to the electrostatic recording medium in advance to thereby lower the discharge initiation voltage in recording. However, it is troublesome to achieve uniform charging by the prior art technique which comprises imparting an electrostatic charge in advance to the electrostatic recording medium by rubbing the same with a bar made of a styrenic resin, for instance, in the process for preparing the same. Insufficient charging may sometimes occur depending on localities and, in such case, good image records cannot always be obtained.

Accordingly, it is an object of the invention to provide an electrostatic recording medium which features a minimum of dropout and a minimum of flare even in high-density recording of the order of 400 dots/inch without needing charging treatment thereof prior to recording.

The above and other objects, as well as various features, of the present invention will become apparent from the following description.

The present invention provides an electrostatic recording medium comprising an electroconductive support and a dielectric layer formed on said electroconductive support and containing an insulating resin and a pigment, said pigment comprising kaolin having a quartz content of not more than 2% by weight and said dielectric layer having, on the surface thereof, projections resulting from said pigment and having an equivalent diameter of 5–15 $\mu$m as spacers.

The present inventors conducted investigations on various pigments for use in the dielectric layer with respect to their chemical composition and the manner of their arrangement on the dielectric layer surface and, as a result, found that when the dielectric layer is provided with spacers of a size within a specific range which are substantially made of kaolin excellent image recording can be achieved. Since kaolin is inferior in chargeability and its use results in some tendency toward decrease in the density of record images, the daring use of kaolin in the dielectric layer for some or other particular purposes has been out of question. Unexpectedly, however, the present inventors found that when the dielectric layer contains a kaolin species having a low quartz content as spacers, excellent image recording can be achieved with minimum of dropout and flare. This novel finding has now led to completion of the present invention.

The present invention makes it possible to obtain, even in high-density electrostatic recording of the order of 400 dots/inch, distinct images with no substantial irregularities in record density without the step of imparting in advance an electrostatic charge opposite in polarity to the electrostatic charge for recording while minimizing the phenomena of dropout and flare.

In accordance with the invention, it is essential that the dielectric layer contains a pigment component which comprises kaolin having a quartz content of not more than 2% by weight. As a result, there can be formed, on the dielectric layer surface, projections having an equivalent diameter of 5–15 $\mu$m with said pigment component as the nucleus. The term "equivalent diameter" as used herein means the value d defined by the equation:

$$d=2\,(s/\pi)^{\frac{1}{2}}$$

where s is the project area of a projection as found when the dielectric layer surface is observed under a scanning electron microscope.

In the recording medium according to the invention, the projections having an equivalent diameter of 5–15 $\mu$m serve as spacers. Namely, they keep the distance between the recording electrode head and the dielectric layer within a certain definite range.

Figure 2:
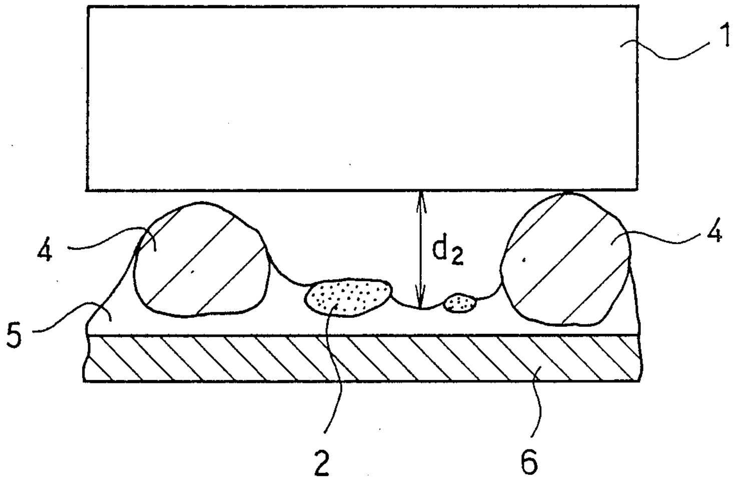

FIG. 1 illustrates an embodiment of the invention, wherein the projection formed by a kaolin particle (2) or kaolin particles (3) functions as a spacer for defining the distance between the dielectric layer (5) and the multi-stylus electrode head (1). FIG. 2 illustrates an electrostatic recording medium in which the kaolin particle fails to function as a spacer.

Referring to FIG. 1, wherein the projections according to the invention function as spacers, the projections having an equivalent diameter of 5–15 $\mu$m may be formed by one pigment particle (2) or by an aggregate (3) of smaller pigment particles. In FIG. 1, the projections come in contact with the multi-stylus electrode head (1) and thus keep constant the distance $d_1$ between the lower end surface of the multi-stylus electrode head (1) and the surface of the dielectric layer (5) of the electrostatic recording medium. Referring to FIG. 2, however, even when projections (2) made of kaolin and having an equivalent diameter of 5–15 μm are present on the dielectric layer surface, projections (4) made of a different pigment and having a greater equivalent diameter, if present, will define the distance $d_2$ between the multi-stylus electrode head (1) and the dielectric layer surface ($d_2$ being greater than $d_1$) and thus make it impossible for the effects of the invention to be produced. In FIG. 1 and FIG. 2, the reference numeral (6) indicate the electroconductive support.

In the practice of the invention, it is not necessary that kaolin projections should always be present just under each stylus electrode of the multi-stylus electrode head but it is sufficient that kaolin projections can come into contact with some or other parts of the multi-stylus electrode head surface as a whole which includes stylus electrodes in its constitution and that they can thereby keep the dielectric layer at a constant distance from said head surface.

The kaolin to be contained in the dielectric layer in accordance with the invention includes, within the meaning thereof, kaolin group minerals such as halloysite, hydrated halloysite, kaolinite, dickite and nacrite, and these may be used either alone or in admixture. They may be used also in a form readily dispersible in organic solvents as resulting from surface treatment with stearic acid, a silane coupling agent (e.g. chloropropyltrimethoxysilane, vinyltrichlorosilane, methyltrimethoxysilane, etc.), an organic titanate (e.g. tetraisopropoxytitanium, tetrastearoxytitanium, etc.), a silicone or the like. Among them, kaolinite is preferred because of its being superior in the dropout and flare obviating effect. Naturally occurring kaolin group minerals may sometimes contain quartz as an impurity. In case quartz and the like substances which are ranked high on the Mohs scale of hardness, namely have a hardness of 7, come into contact with the recording electrode head, scratches may be produced on the electrode surface. These scratches can serve as sites of electrostatic focusing on the occasion of discharge and cause flare. Accordingly, in accordance with the present invention, those species of kaolin which have a quartz content of not more than 2% by weight, preferably not more than 1.5% by weight, more preferably not more than 1% by weight, should be used.

The flare and dropout obviating effect which kaolin species having a low quartz content can produce is peculiar to said kaolin species. No dropout and flare obviating effect can be produced when in place of kaolin, metal powders, corn starch, plastic pigments, calcined clay, or clay species other than kaolin, such as pyrophyllite and montmorillonite, are used as spacers.

The electrostatic recording medium according to the present invention have projections having a specific size, namely an equivalent diameter of 5–15 μm, on the dielectric layer surface. For the formation of such projections, kaolin to be used should preferably have a weight average particle size of 1–10 μm, more preferably 2–10 μm, most preferably 3–6 μm.

Kaolin species which are generally used are relatively fine and have a weight average particle size of less than 1 μm. When such fine used, irregularities in record density are undesirably noted on the occasion of all mark pattern recording. Those species which contain excessively large particles, for example particles exceeding 20 μm in size, in high percentages (e.g. more than 10%) are also undesirable since they give partly unrecorded all mark pattern.

If all the projections occurring on the dielectric layer have an equivalent diameter of less than 5 μm, discharge cannot take place uniformly and all mark pattern will result in irregularities in record density. If, conversely, projections having an equivalent diameter exceeding 15 μm are present in large numbers, the distance between the multi-stylus electrode and the dielectric layer will become too great in places for discharge to take place, hence good record images will not be obtained. Usually, it is preferable that the dielectric layer is formed such that about 5 to 9,000 spacers made of a kaolin particle or an aggregate of kaolin particles and having an equivalent diameter of 5–15 μm can be found per square millimeter. If the number of spacers having an equivalent diameter of 5–15 μm is much smaller, the distance between the multi-stylus electrode and the dielectric layer surface sometimes cannot be kept within an adequate range in places due to unevenness and undulation of paper sheets, among others. Conversely, if the number of such projections is too great, the record density will generally fall.

If the amount of kaolin used is excessively small, recording media having a certain constant surface smoothness cannot be produced unless the kaolin species used has a relatively great particle size and a very uniform particle size distribution. Conversely, excessively high kaolin contents will cause decreases in record density. Accordingly, the kaolin content of the dielectric layer should be adjusted to 2–40% by weight, preferably 5–30% by weight, based on the total solids content of the dielectric layer.

The single use of kaolin as the pigment in forming the dielectric layer may sometimes render the writability somewhat unsatisfactory and the luster somewhat excessive. These problems, however, can be solved by combinedly using some other pigment having a smaller particle size. As examples of such pigment which are suited for the combined use, there may be mentioned aluminum hydroxide, alumina, calcium pyrophosphate, zinc carbonate, barium carbonate, barium sulfate, barium nitrate, barium titanate, lead stearate, potassium sulfate, calcium carbonate, talc, calcium hydroxide, calcined kaolin, amorphous silica and plastic pigments, such as those made of polyethylene, epoxy resins and polyacrylonitrile, as well as modifications of these pigments as obtained by surface treatment with tallow, a silicone, stearic acid, an organic titanate or the like. Surface treatment of the pigments with such a substance as mentioned above can increase the insulating property thereof and, when the so-treated pigments are used in combination with kaolin, excellent record densities can be obtained.

If, as shown in FIG. 2, a pigment (4) other than kaolin serves as spacers, dropout occurs. Therefore, it is desirable that a pigment free of that fraction which is composed of particles greater than 5 μm in size should be used as far as possible as the above pigment to be used combinedly with kaolin. Thus, such pigment to be used combinedly with kaolin should preferably have a weight average particle size of not more than 4 μm, in particular within the range of 4–0.2 μm, desirably less than 2 μm, in particular within the range of 1.5–0.2 μm.

From the view point of record density, the pigment to be used combinedly with kaolin should preferably have a specific resistance of not less than $10^6$ Ω.cm, more preferably about $10^6$ to $10^{12}$ Ω.cm; the specific resistance is an index of insulating property.

Such pigment having a relatively smaller weight average particle size (particularly of less than 2 μm) and incapable of forming projections having an equivalent diameter of about 5–15 μm is used in an amount of about 0.1–500 parts by weight, preferably about 1–100 parts by weight, per 100 parts by weight of kaolin.

Investigations by the present inventors have revealed that generally recording media have a problem in respect of the continuous recording characteristic, and that the continuous recording characteristic is not improved with the recording medium obtained by using, as mentioned above, kaolin having a quartz content of not more than 2% by weight as a pigment for projection formation. Namely, when recording media are used for recording continuously for a long period, the number of dropout gradually increases although good images can be obtained in the initial stage of recording. In continuous recording up to about 50 m, this is not a very serious problem. However, when the continuous recording exceeds 100 m in length, the deposition of foul matter on the recording electrode head is no more negligible and leads to a rapid increase in the frequency of dropout; accordingly, cleaning of the recording electrode head is usually necessary in time to prevent recording characteristic deterioration. While the reason why even the electrostatic recording media having kaolin spacers have such drawback is not very clear, it is conceivable that gradual erosion of kaolin projections together with the insulating resin as resulting from friction with the recording electrode head or heat generation by discharge because of the low hardness of kaolin (Mohs hardness 1 to 2) produce a foul matter and this adheres to the head.

In a preferred embodiment of the present invention, the above problem can be solved by the use, as a pigment component additional to the above-mentioned kaolin, of at least one member selected from the class consisting of calcium carbonate, amorphous silica and aluminum hydroxide. This embodiment is described hereinbelow.

As mentioned above, even the electrostatic recording media having kaolin spacers have insufficient continuous recording characteristic due to foul matter deposition. Said preferred embodiment of the invention is characterized in that in addition to the above-mentioned kaolin, at least one of calcium carbonate, amorphous silica and aluminum hydroxide is added to the dielectric layer-forming composition for the formation of projections having an equivalent diameter of 5–15 μm. It is to be noted that the use of calcium carbonate, amorphous silica, aluminum hydroxide, magnesium hydroxide, aluminum oxide, barium carbonate, calcined clay and so forth in combination with the aforementioned kaolin can result in effective elimination of the foul matter from the recording electrode head, whereby electrostatic recording media having excellent continuous recording characteristic as well can be obtained. The true reason for this is unknown. It is conceivable, however, that these pigments are not so high in Mohs scale hardness as quartz but yet are hard enough to serve for rubbing off the foul matter from the electrodes when they come into contact with the electrodes without damaging the electrodes. However, magnesium hydroxide, aluminum oxide, barium carbonate, calcined clay and the like are apt to cause flare. Consequently, calcium carbonate, amorphous silica and aluminum hydroxide are preferred and, among them, calcium carbonate and amorphous silica are most preferred.

For most efficient removal of foul matter from the recording electrode head and for least interference with the effect of kaolin, it is desirable that at least one of calcium carbonate, amorphous silica and aluminum hydroxide should form, on the dielectric layer surface, projections having an equivalent diameter of 5–15 μm which is approximately equal to that of kaolin-based projections. For that purpose, calcium carbonate should have a weight average particle size of 2–10 μm, preferably 2–6 μm, amorphous silica should have a weight average particle size (size of agglomerate) of 1–10 μm, preferably 2–6 μm, and aluminum hydroxide should have average particle size of 1–10 μm, preferably 2–6 μm.

When the proportion, among the projections based on the above-specified pigments, of those projections which are based on at least one of calcium carbonate, amorphous silica and aluminum hydroxide is small, the tendency toward gradual increase in the frequency of dropout in continuous recording cannot be corrected to a satisfactory extent. When, conversely, said proportion is too large, flare and dropout take place from the beginning of recording without substantial improvement. Generally, good results can be obtained when at least one of calcium carbonate, amorphous silica and aluminum hydroxide is used in an amount of 10–1,000 parts by weight, preferably 15–100 parts by weight, more preferably 15–60 parts by weight, per 100 parts by weight of kaolin having a quartz content of not more than 2% by weight.

In this embodiment, the distance between the multi-stylus electrode and the dielectric layer can be kept within a certain adequate range by the projections formed by kaolin and the above-mentioned specific pigment and having an equivalent diameter of 5–15 μm. If, on the contrary, the dielectric layer surface has only those projections which have an equivalent diameter of less than 5 μm, a sufficient space cannot be obtained between the multi-stylus electrode and the dielectric layer, and hence discharge cannot take place in places on the occasion of recording. As a result, inferior uniformity in the density of records will be obtained in all mark pattern recording. The presence of a large number of projections having an equivalent diameter exceeding 15 μm is also unfavorable, since the space between the multi-stylus electrode and the dielectric layer becomes too wide in places, where discharge cannot take place either, and hence sufficient uniformity in record density will not be obtained in all mark pattern recording, with increased frequency of dropout. When the number of projections having an equivalent diameter of 5–15 μm is small, the space between the multi-stylus electrode and the dielectric layer surface cannot be kept in an adequate range depending on localities due, for example, to unevenness and undulation of paper sheets. When, conversely, such projections are present in excessively large numbers, the density of records tends to decrease. Therefore, it is desirable to form the dielectric layer such that projections having an equivalent diameter of 5–15 μm are present in a density of at least 5, in particular about 5-9,000, per square millimeter, without allowing the presence of extremely large projections exceeding 20 μm in equivalent diameter. For this purpose, the total content of the afore-mentioned kaolin plus at least one of the above-mentioned calcium carbonate, amorphous silica and aluminum hydroxide in the dielectric layer should be about 5-65% by weight, preferably about 10–50% by weight, based on the total solids of the dielectric layer.

In any of the above embodiments, the pigments, namely the above-specified kaolin having a quartz content of not more than 2% by weight, and another or other pigments than kaolin which are used combinedly with said kaolin for the purpose of attaining improved writability and decreased luster and have a smaller particle size, and/or at least one pigment selected from the group consisting of calcium carbonate, amorphous silica and aluminum hydroxide and intended for combined use with said kaolin for the purpose of improving the continuous recording characteristic are generally dispersed in water or an organic solvent by means of a ball mill, attriter, high speed stirrer or the like. On that occasion, the particle size can be adjusted. Dispersing agents may be used for promoting dispersion. The dispersion obtained is made up into a coating composition for dielectric layer formation by dissolving an insulating resin therein. Thus, said coating composition is generally prepared by dispersing the pigment or pigments in water or in an organic solvent such as methyl isobutyl ketone, methyl ethyl ketone, toluene or xylene, and then dissolving an insulating resin in the dispersion. The total solid content is adjusted to about 10–50% by weight. The coating composition for dielectric layer formation thus obtained is applied to an electroconductive support by means of a curtain coater, gravure coater, bar coater, air knife coater, blade coater or the like and then dried. In this way, the dielectric layer according to the invention can be obtained as formed on the surface of said electroconductive support and having desired projections having an equivalent diameter of 5–15 μm as spacers. It is preferable that the dielectric layer has Bekk smoothness of about 20 to 150 seconds.

Usable as the insulating resin for forming the dielectric layer are polyvinyl acetate, ethylene-vinyl acetate copolymer, polyvinyl chloride, vinyl chloride-vinyl acetate copolymer, polyvinylidene chloride, polyacrylate ester, especially $C_1$–$C_4$ alkyl acrylate polymer, polymethacrylate ester, especially $C_1$–$C_4$ alkyl methacrylate polymer, butyral resin, polyester, polyvinylidene fluoride, nitrocellulose, polystyrene, styrene-acrylic copolymer, silicone resin, epoxy resin, styrene-butadiene copolymer, vinyl acetate-methacrylate ester copolymer, vinyl acetate-crotonate ester (e.g. $C_1$–$C_4$ alkyl crotonate) copolymer, vinylidene chloride-vinyl chloride copolymer, vinylidene chloride-acrylonitrile copolymer, urethane resin, stearyl methacrylate-chloroprene copolymer, phenol resin and so on. Among them, polymers and copolymers of methyl methacrylate, butyl methacrylate and styrene as well as polyester resins are preferably used from the chargeability and ease of application viewpoints.

Usable as the electroconductive support for constituting the electrostatic recording medium are paper sheets, plastic films, synthetic paper sheets, Japanese paper sheets and the like caused to have a Bekk smoothness of not less than 200 seconds as well as caused to have a surface resistance of about $10^5$ to $10^9$ Ωby impregnation or coating with an inorganic salt, such as sodium chloride or calcium chloride, a cationic polyelectrolyte, such as polyvinylbenzyltrimethylammonium chloride, polydimethyldiallylammonium chloride or styrene-acryltriethylammonium chloride copolymer, an anionic polyelectrolyte, such as polystyrenesulfonic acid, polyacrylic acid or polyvinyl phosphate, a metal oxide semicondutor in powder form, such as zinc oxide or tin oxide, or the like.

The following examples are further illustrative of the present invention but are by no means limitative of the scope thereof. In the examples and comparative examples, "part(s)" and "%" are "part(s) by weight" and "% by weight", respectively, unless otherwise indicated.

EXAMPLE 1

To a wood-free paper weighing 53 g/m² was applied a cationic polyelectrolyte (trade name: Chemistat 6300, manufactured by Sanyo Chemical Industries) in an amount of 3 g/m² (dry basis) on the face side and in an amount of 2 g/m² (dry basis) on the reverse side, and the coated paper was supercalendered to improve surface smoothness, thereby providing an electroconductive support. This conductive support had a Bekk smoothness of 300 seconds and a surface resistance of $5\times10^7$ Ω.

To the face side of this conductive support was applied a coating composition for dielectric layer formation, which had the composition shown below, in an amount of 5 g/m² (dry basis) to provide an electrostatic recording medium. Said coating composition was prepared by using an attriter so that a Bekk smoothness of 100±30 seconds could be obtained after application.

| | |
|---|---|
| Toluene | 200 parts |
| Kaolinite (particles having a size of 2 μm or less accounting for 35%, weight average particle size 3.8 μm; quartz content 0.1%; trade name: Filler MCS, manufactured by Engelhard) | 15 parts |
| Precipitated calcium carbonate (granular pigment; weight average particle size 1.27 μm; specific resistance $2.1\times10^8$ Ω · cm) | 15 parts |
| Polymethyl methacrylate resin | 70 parts |

Observation of the dielectric layer surface of the recording medium with an X-ray microanalyzer (EPMA) revealed that the distribution of aluminum assignable to kaolinite was equivalent to that of large projections observed in a scanning electron microscope (SEM) picture. Each square millimeter had, on an average, $4\times10^2$ kaolinite-derived projections having an equivalent diameter of 5–15 μm as calculated from the project area thereof (measured edgewise). The distribution of projections due to precipitated calcium carbonate as found by EPMA analysis mostly corresponds to that of smaller pigment projections found in the SEM picture. Thus the dielectric layer of the recording medium had a constitution such that kaolinite-based projections could serve as spacers. This recording medium was excellent in writability as tested with a marker pen (water base). It had an adequate luster.

EXAMPLE 2

A coating composition for dielectric layer formation was prepared and an electrostatic recording medium was fabricated in the same manner as in Example 1 except that 30 parts of dickite (particles having a size of 2 μm or less accounting for 49.5%, particles having a size of 10 μm or more accounting for 3.5%; weight average particle size 2.1 μm; quartz content 1.8%; trade name: NK-Kaolin SD-300, manufactured by Chuo Kaolin) was used as the pigment in lieu of the kaolinite (particles having a size of 2 μm or less accounting for 35%; weight average particle size 3.8 μm; trade name: Filler MCS, manufactured by Engelhard) and precipitated calcium carbonate (granular pigment; average particle size 1.27 μm; specific resistance $2.1\times10^8$ Ω.cm).

Dickite-based projections having an equivalent diameter of 5–15 μm were observed in an average amount of $1.2\times10^3$ per square millimeter and the dielectric layer of the recording medium had a constitution such that said dickite-based projections could serve as spacers.

EXAMPLE 3

An electrostatic recording medium was fabricated in the same manner as in Example 2 except that 30 parts of kaolinite having a weight average particle size of 1.3 μm and a quartz content of 0.8% (particles having a size of 2 μm or less accounting for 65.6% and particles having a size of 10 μm or more for 1.3%; trade name: Biliton Kaolin, manufactured by PT UTAMA) was used in lieu of the dickite (particles having a size of 2 μm or less accounting for 49.5% and particles having a size of 10 μm or more for 3.5%; weight average particle size 2.1 μm; quartz content 1.8%; trade name: NK-Kaolin SD-300, manufactured by Chuo Kaolin).

Each square millimeter was found to have, on an average, $8\times10^2$ kaolinite-based projections having an equivalent diameter of 5–15 μm.

COMPARATIVE EXAMPLE 1

A dielectric coating composition was prepared using an attriter in the same manner as in Example 1 except that 15 parts of kaolinite 92% of which had a particle size of 2 μm or less (quartz content 0.1%; weight average particle size 0.8 μm; trade name: Ultrawhite 90, manufactured by Engelhard) was used in lieu of 15 parts of the kaolin 35% of which had a particle size of 2 μm or less. After application of this composition, there was obtained an electrostatic recording medium having a Bekk smoothness of 200 seconds.

The kaolinite-based projections and precipitated calcium carbonate-based projections were almost equivalent in size. Any spacers having an equivalent diameter of 5–15 μm were not observed in any square millimeter.

COMPARATIVE EXAMPLE 2

An electrostatic recording medium was fabricated in the same manner as in Example 1 except that 15 parts of kaolinite having a weight average particle size of 0.8 μm and a quartz content of 0.1% (trade name: Ultrawhite 90, manufactured by Engelhard) was used in lieu of the kaolinite 35% of which had a particle size of 2 μm or less and that 15 parts of ground calcium carbonate having a weight average particle size of 5 μm and a specific resistance of $10^9$ Ω.cm was used in lieu of the precipitated calcium carbonate (granular pigment; weight average particle size 1.27 μm; specific resistance $2.1\times10^8$ Ω.cm)

EPMA observation revealed that the ground calcium carbonate-based projections in the dielectric layer were greater than those formed by kaolinite and that, therefore, the ground calcium carbonate-based projections were to serve as spacers. The presence of, on an average, $5\times10^2$ ground calcium carbonate-based spacers having an equivalent diameter of 5–15 μm per square millimeter was observed.

COMPARATIVE EXAMPLE 3

An electrostatic recording medium was fabricated in the same manner as in Example 2 except that the dielectric coating composition was prepared by using talc (weight average particle size 8.2 μm; trade name: NK-Talc, manufactured by Chuo kaolin) was used in lieu of the dickite.

Talc-based projections having an equivalent diameter of 5–15 μm were observed in an average amount of $8\times10^2$ per square millimeter.

COMPARATIVE EXAMPLE 4

An electrostatic recording medium was fabricated in the same manner as in Example 2 except that pyrophyllite (weight average particle size 2.8 μm; trade name: ST Kaolin Clay, manufactured by Tsuchiya Kaolin) was used in lieu of the dickite.

Pyrophyllite-based projections having an equivalent diameter of 5–15 μm were observed in an average amount of $2.5\times10^3$ per square millimeter.

COMPARATIVE EXAMPLE 5

An electrostatic recording medium was fabricated in the same manner as in Example 2 except that 30 parts of a polyolefin powder having a weight average particle size of 8 μm (trade name: Unistol R-100, manufactured by Mitsui Petrochemical Industries) was used in lieu of the dickite (weight average particle size 2.1 μm; quartz content 1.8%; trade name: NK-Kaolin SD-300, manufactured by Chuo Kaolin).

Polyolefin-based projections having an equivalent diameter of 5–15 μm were observed in an average amount of $5\times10^3$ per square millimeter.

COMPARATIVE EXAMPLE 6

An electrostatic recording medium was fabricated in the same manner as in Example 1 except that 15 parts of an amorphous silica powder having a weight average particle size (size of agglomerate) of 7 μm with particles having a size of 10 μm or more accounting for 2% (trade name: Syloid 74, manufactured by Fuji-Davison) was used in lieu of the kaolinite having a weight average particle size of 3.8 μm with particles having a size of 2 μm or less accounting for 35%.

Amorphous silica-based projections having an equivalent diameter of 5–15 μm were observed in an average density of $3\times10^3$ per square millimeter.

COMPARATIVE EXAMPLE 7

An electrostatic recording medium was fabricated in the same manner as in Example 2 except that a mixed pigment composed of kaolin, pyrophyllite and quartz (particles having a size of 2 μm or less accounting for 45% and particles having a size of not less than 10 μm for 8%; weight average particle size 1.8 μm, quartz content 4.5%; trade name: NN-Kaolin Clay, manufactured by Tsuchiya Kaolin) was used in lieu of the dickite.

Projections having an equivalent diameter of 5–15 μm were found in an average density of $1.0\times10^3$ per square millimeter.

RECORDING TEST

Using each of the electrostatic recording media obtained in Examples 1–3 and Comparative Examples 1–7, one-dot fine line recording was carried out on Matsushita Graphic Communication System Inc.'s electrostatic plotter EP-101. The results of recording were evaluated in terms of the total length (mm) of dropout regions and the number of abnormal dots due to flare, each per meter of the fine line recorded. Furthermore, all mark pattern recording was carried out for evaluation in terms of irregularity in the density of records. The results thus obtained are summarized in Table 1.

The irregularity in record density was evaluated macroscopically according to the following criteria:

A: No record density irregularity observed.

B: Significant record density irregularity observed.

For the record density measurement, a Macbeth densitometer (model RD-914, manufactured by Macbeth) was used.

TABLE 1

| | Dropout (mm) | Number of abnormal dots (Flare) | Record density irregularity | Record density |
|---|---|---|---|---|
| Example 1 | 0.3 | 5 | A | 1.10 |
| Example 2 | 0.3 | 30 | A | 1.12 |
| Example 3 | 0.3 | 10 | A | 1.10 |
| Comparative Example 1 | 35.0 | 20 | B | 1.05 |
| Comparative Example 2 | 40.0 | 50 | A | 1.08 |
| Comparative Example 3 | 10.0 | 70 | A | 1.10 |
| Comparative Example 4 | 50.0 | 150 | A | 1.05 |
| Comparative Example 5 | 60.0 | 5 | A | 1.15 |
| Comparative Example 6 | 40.0 | 3 | A | 1.04 |
| Comparative Example 7 | 1.0 | 250 | A | 1.05 |

It is apparent from Table 1 that the electrostatic recording media according to the invention are excellent and can give clear and distinct images even in high density electrostatic recording of the order of 400 dots/inch without the step of preliminarily imparting an electrostatic charge opposite in polarity to the electrostatic charge for recording to the dielectric layer and with a minimum of dropout and a minimum of flare.

EXAMPLE 4

An electroconductive support was prepared in the same manner as in Example 1 and was coated with a coating composition for dielectric layer formation, which had the composition shown below, in an amount of 5 $g/m^2$ (dry basis) and dried to provide an electrostatic recording medium.

| | |
|---|---|
| Toluene | 100 parts |
| MEK (methyl ethyl ketone) | 100 parts |
| Styrene-butyl methacrylate (3:1) copolymer resin | 70 parts |
| Kaolinite (weight average particle size 5 $\mu m$; quartz content not more than 0.2%; trade name: Hydrite Flat D, manufactured by Georgia Kaolin) | 20 parts |
| Ground calcium carbonate (weight average particle size 4.5 $\mu m$) | 10 parts |

When those projections having an equivalent diameter of 5–15 $\mu m$ as found on a SEM picture of the dielectric layer surface of the recording medium were examined with an X-ray microanalyzer (EPMA), both the distribution of aluminum of kaolinite and the distribution of calcium of ground calcium carbonate were found intermingledly. Almost no projections had an equivalent diameter exceeding 15 $\mu m$.

EXAMPLE 5

An electrostatic recording medium was fabricated in the same manner as in Example 4 except that the coating composition of dielectric layer formation was modified as follows:

| | |
|---|---|
| Toluene | 100 parts |
| MEK | 100 parts |
| Styrene-butyl methacrylate (3:1) copolymer resin | 70 parts |
| Kaolinite (weight average particle size 5 $\mu m$; quartz content not more than 0.2%; trade name: Hydrite Flat D, manufactured by Georgia Kaolin) | 20 parts |
| Amorphous silica (weight average particle size 4.1 $\mu m$; trade name: Nipsil SS-70, manufactured by Nippon Silica) | 10 parts |

When those projections having an equivalent diameter of 5–15 $\mu m$ as found on a SEM picture of the dielectric layer surface of the recording medium were examined with an X-ray microanalyzer (EPMA), both the distribution of aluminum of kaolinite and the distribution of aluminum-free projections, namely projections based on amorphous silica, were found intermingledly. Almost no projections had an equivalent diameter exceeding 15 $\mu m$.

EXAMPLE 6

An electrostatic recording medium was fabricated in the same manner as in Example 4 except that the coating composition for dielectric layer formation was modified as follows:

| | |
|---|---|
| Toluene | 100 parts |
| MEK | 100 parts |
| Styrene-butyl methacrylate (3:1) copolymer resin | 70 parts |
| Kaolinite (weight average particle size 5 $\mu m$; quartz content not more than 0.2%; trade name: Hydrite Flat D, manufactured by Georgia Kaolin) | 20 parts |
| Aluminum hydroxide (weight average particle size 4.0 $\mu m$) | 10 parts |

Most of the projections had an equivalent diameter of 5–15 $\mu m$. Almost no projections had an equivalent diameter exceeding 15 $\mu m$.

EXAMPLE 7

An electrostatic recording medium was fabricated in the same manner as in Example 4 except that the coating composition of dielectric layer formation was modified as follows and that said composition was applied in an amount of 7 $g/m^2$ (dry basis):

| | |
|---|---|
| Toluene | 100 parts |
| MEK | 100 parts |
| Styrene-butyl methacrylate (3:1) copolymer resin | 40 parts |
| Kaolinite (weight average particle size 5 $\mu m$.; quartz content not more than 0.2%, trade name: Hydrite Flat D, manufactured by Georgia Kaolin) | 30 parts |
| Ground calcium carbonate (weight | 30 parts |

-continued

| | |
|---|---|
| average particle size 4.5 μm) | |

When those projections having an equivalent diameter of 5–15 μm as found on a SEM picture of the dielectric layer surface of the recording medium were examined with an X-ray microanalyzer (EPMA), both the distribution of aluminum of kaolinite and the distribution of calcium of ground calcium carbonate were found intermingledly. Almost no projections had an equivalent diameter exceeding 15 μm.

EXAMPLE 8

An electrostatic recording medium was fabricated in the same manner as in Example 4 except that the coating composition for dielectric layer formation was modified as follows and applied in an amount of 4 g/m$^2$ (dry basis):

| | |
|---|---|
| Toluene | 100 parts |
| MEK | 100 parts |
| Styrene-butyl methacrylate (3:1) copolymer resin | 93 parts |
| Kaolinite (weight average particle size 5 μm, quartz content not more than 0.2%; trade name: Hydrite Flat D, manufactured by Georgia (Kaolin) | 5 parts |
| Ground calcium carbonate (weight average particle size 4.5 μm) | 2 parts |

When those projections having an equivalent diameter of 5–15 μm as found on a SEM picture of the dielectric layer surface of the recording medium were examined with an X-ray microanalyzer (EPMA), both the distribution of aluminum of kaolin and the distribution of calcium of ground calcium carbonate were observed intermingledly. Almost no projections had an equivalent diameter exceeding 15 μm.

COMPARATIVE EXAMPLE 8

An electrostatic recording medium was fabricated in the same manner as in Example 4 except that the coating composition for dielectric layer formation was modified as follows:

| | |
|---|---|
| Toluene | 100 parts |
| MEK | 100 parts |
| Styrene-butyl methacrylate (3:1) copolymer resin | 70 parts |
| Kaolinite (weight average particle size 0.8 μm; quartz content not more than 0.2%; trade name: Hydrite R, manufactured by Georgia Kaolin) | 20 parts |
| Ground calcium carbonate (weight average particle size 4.5 μm) | 10 parts |

Observation of the dielectric layer surface of the recording medium with an X-ray microanalyzer (EPMA) revealed that the distribution of aluminum of kaolinite was corresponding to the distribution of projections having an equivalent diameter of less than 5 μm as found on a SEM picture. EPMA observation revealed that the projections having an equivalent diameter of 5–15 μm as found on the SEM picture were formed from ground calcium carbonate. Almost no projections had an equivalent diameter exceeding 15 μm.

COMPARATIVE EXAMPLE 9

An electrostatic recording medium was fabricated in the same manner as in Example 4 except that the coating composition for dielectric layer formation was modified as follows:

| | |
|---|---|
| Toluene | 100 parts |
| MEK | 100 parts |
| Styrene-butyl methacrylate (3:1) copolymer resin | 70 parts |
| Kaolinite (weight average particle size 12 μm; quartz content not more than 0.2%) | 20 parts |
| Ground calcium carbonate (weight average particle size 4.5 μm) | 10 parts |

Observation of the dielectric layer surface of the recording medium with an X-ray microanalyzer (EPMA) revealed that the distribution of aluminum of kaolinite included a large number of projections corresponding to those projections having an equivalent diameter exceeding 15 μm as found on a SEM picture.

COMPARATIVE EXAMPLE 10

An electrostatic recording medium was fabricated in the same manner as in Example 4 except that the coating composition for dielectric layer formation was modified as follows:

| | |
|---|---|
| Toluene | 100 parts |
| MEK | 100 parts |
| Styrene-butyl methacrylate (3:1) copolymer resin | 70 parts |
| Kaolinite (weight average particle size 5 μm; quartz content not more than 0.2%; trade name: Hydrite Flat D, manufactured by Georgia Kaolin) | 20 parts |
| Polyacrylonitrile-made plastic pigment (weight average particle size 4.2 μm) | 10 parts |

When those projections having an equivalent diameter of 5–15 μm as found on a SEM picture were examined with an X-ray microanalyzer (EPMA), both the distribution of aluminum of kaolinite and the distribution of plastic pigment-based projections free of aluminum were noted intermingledly. Almost no projections had an equivalent diameter exceeding 15 μm.

RECORDING TEST

One-dot continuous recording was carried out on a Matsushita Graphic Communication System Inc.'s model EP-101 A1 electrostatic plotter using the electrostatic recording media fabricated in Examples 4–8 and Comparative Examples 8–10. The recording was conducted over a length of 1,000 m for each recording medium. The recording electrode head was cleaned with a cleaning agent after every one-dot, 1,000-m continuous recording. The total length (in mm) of dropout regions per meter of the fine line obtained and the number of abnormal dots (flares) per meter of said fine line were determined at each of the following sites: start, 100 m, 300 m, 500 m, 800 m and 1,000 m. The results thus obtained are shown in Table 2.

RECORD DENSITY

All mark pattern recording was carried out on a Matsushita Graphic Communication System Inc.'s model EP-101 Al electrostatic plotter and the record density was measured with a Macbeth densitometer (RD-914, manufactured by Macbeth).

UNIFORMITY IN ALL MARK PATTERN RECORDING

The all mark pattern records obtained were evaluated for uniformity macroscopically according to the following criteria:

A : Superior in uniformity.

B : Somewhat inferior in uniformity.

C : Inferior in uniformity so that the medium cannot be put to practical use.

The record density data and uniformity evaluation results obtained in all mark pattern recording are shown in Table 3.

The recording media obtained in Examples 4–6 were excellent in continuous recording characteristic and in uniformity in all mark pattern recording with a minimum frequency of dropout and abnormal dot (flare) at the time of start of recording. The recording medium of Example 7 which had a pigment content in the dielectric layer of 60% by weight (on the total solids basis) was generally satisfactory in continuous recording characteristic with a minimum frequency of dropout although the record density was a little decreased. The recording medium of Example 8 which had a pigment content in the dielectric layer of 7% by weight (on the total solids basis) was generally good in continuous recording characteristic with a minimum frequency of dropout although it was inferior in the uniformity in all mark pattern recording.

The recording medium of Comparative Example 8 in which the kaolinite used had a weight average particle size of 0.8 μm allowed frequent occurrence of flare and dropout and was inferior in the uniformity in all mark pattern recording. The recording medium of Comparative Example 9 in which the kaolinite used had a weight average particle size of 12 μm was worst in the uniformity in all mark pattern recording with frequent occurrence of dropout and the recording medium was also unsatisfactory in continuous recording characteristic. The recording medium of Comparative Example 10 in which kaolinite was used in combination with the plastic pigment was poor in continuous recording characteristic.

TABLE 2

| | | Continuous recording in length (m) | | | | | |
|---|---|---|---|---|---|---|---|
| | | Start | 100 | 300 | 500 | 800 | 1000 |
| Example 4 | Dropout | 0.3 | 0.2 | 0.4 | 0.4 | 0.3 | 0.5 |
| | Flare | 11 | 11 | 14 | 17 | 12 | 19 |
| Example 5 | Dropout | 0.6 | 0.3 | 0.6 | 0.2 | 0.3 | 0.7 |
| | Flare | 14 | 11 | 12 | 9 | 15 | 18 |
| Example 6 | Dropout | 0.8 | 0.5 | 0.7 | 0.4 | 0.8 | 0.9 |
| | Flare | 19 | 17 | 16 | 20 | 19 | 11 |
| Example 7 | Dropout | 7 | 10 | 8 | 9 | 9 | 8 |
| | Flare | 19 | 18 | 20 | 19 | 23 | 20 |
| Example 8 | Dropout | 0.6 | 2 | 9 | 5 | 12 | 7 |
| | Flare | 11 | 20 | 19 | 23 | 17 | 16 |
| Comparative | Dropout | 18 | 21 | 25 | 29 | 30 | 23 |
| Example 8 | Flare | 31 | 28 | 37 | 40 | 35 | 46 |
| Comparative | Dropout | 20 | 36 | 60 | 41 | 53 | 70 |
| Example 9 | Flare | 29 | 19 | 28 | 18 | 11 | 28 |
| Comparative | Dropout | 0.8 | 14 | 29 | 40 | 35 | 50 |

TABLE 2-continued

| | | Continuous recording in length (m) | | | | | |
|---|---|---|---|---|---|---|---|
| | | Start | 100 | 300 | 500 | 800 | 1000 |
| Example 10 | Flare | 11 | 14 | 12 | 19 | 16 | 15 |

TABLE 3

| | Uniformity in all mark recording | Density of record |
|---|---|---|
| Example 4 | A | 1.20 |
| Example 5 | A | 1.20 |
| Example 6 | A | 1.23 |
| Example 7 | A | 1.05 |
| Example 8 | B | 1.24 |
| Comparative Example 8 | B | 1.10 |
| Comparative Example 9 | C | 1.10 |
| Comparative Example 10 | A | 1.20 |

What is claimed is:

1. An electrostatic recording medium comprising an electroconductive support and a dielectric layer formed on the electroconductive support and containing an insulating resin and a pigment, characterized in that said pigment comprises kaolin having a quartz content of not more than 1% by weight and that said dielectric layer has, on the surface thereof, projections based on said pigment and having an equivalent diameter of 5–15 μm as spacers, the equivalent diameter meaning the value d defined by the equation:

$$d=2\,(s/\pi)^{\frac{1}{2}}$$

where s is the project area of a projection as found when the dielectric layer surface is observed under a scanning electron microscope.

2. An electrostatic recording medium according to claim 1, wherein said kaolin has a weight average particle size of 1–10 μm.

3. An electrostatic recording medium according to claim 1, wherein said kaolin has a weight average particle size of 2–10 μm.

4. An electrostatic recording medium according to claim 1, wherein said kaolin has a weight average particle size of 3–6 μm.

5. An electrostatic recording medium according to claim 1, wherein said kaolin is contained in said dielectric layer in an amount of about 2–40% by weight based on the total solids content of said dielectric layer.

6. An electrostatic recording medium according to claim 1, wherein said kaolin is contained in said dielectric layer in an amount of about 5–30% by weight based on the total solids content of said dielectric layer.

7. An electrostatic recording medium according to claim 1, wherein said pigment comprises, in addition to said kaolin, at least one pigment which is other than kaolin and has a weight average particle size of not more than 4 μm and a specific resistance of not less than $10^6$ Ω.cm.

8. An electrostatic recording medium according to claim 1, wherein said pigment comprises, in addition to said kaolin, at least one pigment which is other than kaolin and has a weight average particle size of 0.2–1.5 μm and a specific resistance of not less than $10^6$ Ω.cm.

9. An electrostatic recording medium according to claim 7, wherein said pigment which is other than kaolin and has a specific resistance of not less than $10^6$ Ω.cm is used in an amount of about 0.1-500 parts by weight per 100 parts by weight of kaolin.

10. An electrostatic recording medium according to claim 7, wherein said pigment which is other than kaolin and has a specific resistance of not less than $10^6$ Ω.cm is used in an amount of about 1-100 parts by weight per 100 parts by weight of kaolin.

11. An electrostatic recording medium according to claim 1, wherein said pigment comprises, in addition to said kaolin, at least one member selected from the group consisting of calcium carbonate, amorphous silica and aluminum hydroxide.

12. An electrostatic recording medium according to claim 11, wherein said calcium carbonate has a weight average particle size of 2-10 μm, said amorphous silica a weight average particle size (size of agglomerate) of 1-10 μm and said aluminum hydroxide a weight average particle size of 1-10 μm.

13. An electrostatic recording medium according to claim 11, wherein said calcium carbonate has a weight average particle size of 2-6 μm, said amorphous silica a weight average particle size (size of agglomerate) of 2-6 μm and said aluminum hydroxide a weight average particle size of 2-6 μm.

14. An Electrostatic recording medium according to claim 11, wherein at least one of calcium carbonate, amorphous silica and aluminum hydroxide is used in an amount of about 10-1,000 parts by weight per 100 parts by weight of kaolin.

15. An electrostatic recording medium according to claim 11, wherein at least one of calcium carbonate, amorphous silica and aluminum hydroxide is used in an amount of about 15-100 parts by weight per 100 parts by weight of kaolin.

16. An electrostatic recording medium according to claim 11, wherein at least one of calcium carbonate, amorphous silica and aluminum hydroxide is used in an amount of about 15-60 parts by weight per 100 parts by weight of kaolin.

17. An electrostatic recording medium according to claim 11, wherein said pigment which comprises said kaolin and at least one of calcium carbonate, amorphous silica and aluminum hydroxide is used in an amount of about 5-65% by weight based on the total solids content of said dielectric layer.

18. An electrostatic recording medium according to claim 11, wherein said pigment which comprises said kaolin and at least one of calcium carbonate, amorphous silica and aluminum hydroxide is used in an amount of about 10-50% by weight based on the total solids content of said dielectric layer.

* * * * *